(12) United States Patent
Okamoto

(10) Patent No.: US 8,271,177 B2
(45) Date of Patent: Sep. 18, 2012

(54) CONTROL DEVICE FOR VEHICULAR DIFFERENTIAL LIMITING APPARATUS

(75) Inventor: Daisuke Okamoto, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 509 days.

(21) Appl. No.: 12/524,301

(22) PCT Filed: Jan. 16, 2008

(86) PCT No.: PCT/JP2008/050388
§ 371 (c)(1),
(2), (4) Date: Jul. 23, 2009

(87) PCT Pub. No.: WO2008/093535
PCT Pub. Date: Aug. 7, 2008

(65) Prior Publication Data
US 2010/0030443 A1 Feb. 4, 2010

(30) Foreign Application Priority Data
Jan. 30, 2007 (JP) .................................. 2007-019258

(51) Int. Cl.
*B60T 8/24* (2006.01)
(52) U.S. Cl. ......................................................... 701/72
(58) Field of Classification Search .......................... None
See application file for complete search history.

(56) References Cited

U.S. PATENT DOCUMENTS

| | | |
|---|---|---|
| 5,450,919 A | 9/1995 | Shitani |
| 5,685,386 A | 11/1997 | Kondo et al. |
| 2001/0037642 A1* | 11/2001 | Uchida .............................. 60/277 |
| 2002/0002436 A1 | 1/2002 | Nishida et al. |

(Continued)

FOREIGN PATENT DOCUMENTS

EP 0 367 962 A1 5/1990

(Continued)

OTHER PUBLICATIONS

Supplementary European Search Report for corresponding European Patent Application 08703249.6 dated Feb. 28, 2011.

*Primary Examiner* — Thomas Tarcza
*Assistant Examiner* — Nagi Murshed
(74) *Attorney, Agent, or Firm* — Sughrue Mion, PLLC

(57) ABSTRACT

A control device for a vehicular differential limiting apparatus is provided, for applying differential limiting torques to a left drive wheel and a right drive wheel of a vehicle during startup and running thereof with favorably suppressing occurrence of deflection of the vehicle. The control device for the vehicular differential limiting apparatus comprises differential limiting torque calculating portion 60 that calculates the differential limiting torques based on a state quantity of the vehicle; differential limiting torque upper-limit guard value calculating portion 62 that calculates differential limiting torque upper-limit guard values based on a preset deflection permit yaw rate and a real yaw rate of the vehicle; and upper limit guard value processing portion 72 that limits the differential limiting torques $\Delta T$ calculated by the differential limiting torque calculating portion 60, using the differential limiting torque upper-limit guard values $\Delta T_L$ calculated by the differential limiting torque upper-limit guard value calculating portion 62, for obtaining differential limiting torques to be applied to the left and right drive wheels. Thus, the most suitable differential limiting torque upper-limit guard values $\Delta T_L$ can be obtained depending on the differential state, so that the differential limiting torques $\Delta T$ are applied to the left and right drive wheels depending on the road surface condition, favorably suppressing deflection of the vehicle.

8 Claims, 6 Drawing Sheets

U.S. PATENT DOCUMENTS

| | | | |
|---|---|---|---|
| 2002/0156581 A1* | 10/2002 | Matsuura | 701/301 |
| 2004/0163856 A1 | 8/2004 | Kroppe | |
| 2004/0267427 A1* | 12/2004 | Suzuki et al. | 701/69 |
| 2005/0121248 A1* | 6/2005 | Ushiroda et al. | 180/248 |
| 2006/0162981 A1* | 7/2006 | Kurosawa et al. | 180/249 |

FOREIGN PATENT DOCUMENTS

| | | |
|---|---|---|
| EP | 1 342 608 A2 | 9/2003 |
| JP | 01-156139 A | 6/1989 |
| JP | 05-262156 A | 10/1993 |
| JP | 06-206458 A | 7/1994 |
| JP | 08-002277 A | 1/1996 |
| JP | 2001-287561 A | 10/2001 |
| JP | 2002-211379 A | 7/2002 |

\* cited by examiner

CONTROL DEVICE FOR VEHICULAR DIFFERENTIAL LIMITING APPARATUS

TECHNICAL FIELD

The present invention relates to a control device for a vehicular differential limiting apparatus which applies differential limiting torques to left and right drive wheels of a vehicle for limiting a differential action between the left and right drive wheels, permitted with a differential gear device of the vehicle.

BACKGROUND ART

There has been known a vehicular differential gear device operative to distribute a drive force, generated by a drive force source, to a left drive wheel and a right drive wheel while permitting a differential action between the left and right drive wheels. The differential gear device has a differential limiting apparatus that applies differential limiting torques to the left and right drive wheels, respectively, for limiting the differential action. A device disclosed in, for instance, Patent publication 1 corresponds to such vehicular differential limiting apparatus. The differential limiting apparatus distributes the drive force, delivered from the drive force source, to the left and right drive wheels while permitting the differential action between the left drive wheel and the right drive wheel. In this moment, the differential limiting torques, determined depending on a difference in rotation between the left and right drive wheels and an accelerator-opening, are applied to the left and right drive wheels depending on a vehicle condition such as a vehicle speed or the like. With such a structure, a freewheeling motion of a drive wheel placed in contact with a low μ-road i.e., low friction coefficient road is minimized. Thus, an output power of the drive force source is efficiently transferred to the drive wheels to render increased startup and acceleration response performance.

[Patent publication 1] Japanese Patent Publication 8-002277

DISCLOSURE OF THE INVENTION

Subject Matter to be Solved by the Invention

When the differential limiting torques are applied to the left and right drive wheels by the differential limiting apparatus, a momentum occurs on the vehicle about a center of gravity thereof due to a difference in torque created between the left drive wheel and the right drive wheel. This may causes an excessive deflection in the vehicle in excess. Especially, during starts up and running of the vehicle on differing μ-roads or straddle road with a difference in friction coefficients of road surfaces with which the left and right drive wheels remained in contact, tire friction circles (i.e., circles representing the magnitudes of critical frictional forces of tires acting from a center of ground contact in a surface direction) of the left and right drive wheels are different from each other. Thus, due to the difference in torque caused on the left and right drive wheels in response to differential limiting torques applied thereto, the vehicle tends to deflect.

The present invention has been completed with the above view in mind, and has an object to provide a control device for a vehicular differential limiting apparatus, for applying differential limiting torques to a left drive wheel and a right drive wheel of a vehicle during startup and running thereof with favorably suppressing occurrence of a deflection of the vehicle.

Subject to be Solved by the Invention

For achieving the above object, a first aspect of the invention relates to a control device for a vehicular differential limiting apparatus for applying differential limiting torques to a left drive wheel and a right drive wheel to limit a differential action, permitted by a differential gear device of a vehicle, between the left and right drive wheels.

The control device for the vehicular differential limiting apparatus comprises (i) differential limiting torque calculating portion that calculates the differential limiting torques based on a state quantity of the vehicle; (ii) differential limiting torque upper-limit guard value calculating portion that calculates differential limiting torque upper-limit guard values based on a preset deflection permit yaw rate and a real yaw rate of the vehicle; and (iii) upper limit guard value processing portion that limits the differential limiting torques calculated by the differential limiting torque calculating portion, using the differential limiting torque upper-limit guard values calculated by the differential limiting torque upper-limit guard value calculating portion, for obtaining differential limiting torques to be applied to the left and right drive wheels, wherein the deflection permit yaw rate is a preset maximum yaw rate at a degree not to cause a vehicle occupant to feel deflection of the vehicle.

In a second aspect of the present invention, in the first aspect, the differential limiting torque upper-limit guard value calculating portion calculates the differential limiting torque upper-limit guard values so as to decrease a difference between the real yaw rate of the vehicle and the deflection permit yaw rate.

In a third aspect of the present invention, in the second aspect, the differential limiting torque upper-limit guard value calculating portion increases the differential limiting torque upper-limit guard values when the real yaw rate of the vehicle is lower than the deflection permit yaw rate.

In a fourth aspect of the present invention, in the second or third aspect, the differential limiting torque upper-limit guard value calculating portion decreases the differential limiting torque upper-limit guard values when the real yaw rate of the vehicle is higher than the deflection permit yaw rate.

In a fifth aspect of the present invention, in one of the first to fourth aspects,
the differential limiting torque upper-limit guard value calculating portion alters the deflection permit yaw rate depending on a steering angle of the vehicle.

In a sixth aspect of the present invention, in one of the second to fifth aspects, (i) the differential limiting torque upper-limit guard value calculating portion calculates a momentum required for realizing the deflection permit yaw rate as a calculated yaw rate, using an inverted model obtained by an observer upon applying an estimated value of the state quantity based on a deviation between the real yaw rate and the calculated yaw rate, for a mathematical model obtained by solving an equation of a kinetic motion of the vehicle in terms of inputs including an input momentum applied to the vehicle and the steering angle of the vehicle and an output including the calculated yaw rate, and (ii) the differential limiting torque upper-limit guard value calculating portion calculates a torque difference between the left and right drive wheels required for generating the required momentum based on the required momentum as the differential limiting torque upper-limit guard values.

In a seventh aspect of the present invention, in one of the first to sixth aspects, the control device for the vehicular differential limiting apparatus further comprises (i) slip-tendency determining portion that determines whether the left and right drive wheels are brought into slip tendencies upon application of the differential limiting torques to the left and right drive wheels; and (ii) slip suppressing portion that is operative to set the differential limiting torques applied to the left and right drive wheels in preset minimal differential limiting torques for suppressing the slip-tendencies, when the slip-tendencies of the drive wheels caused by application of the differential limiting torques is determined by the slip-tendency determining portion.

According to the first aspect of the present invention, in the control device for a vehicular differential limiting apparatus for applying differential limiting torques to a left drive wheel and a right drive wheel to limit a differential action, permitted by a differential gear device of a vehicle, between the left and right drive wheels, the control device for the vehicular differential limiting apparatus comprises (i) differential limiting torque calculating portion that calculates the differential limiting torques based on a state quantity of the vehicle; (ii) differential limiting torque upper-limit guard value calculating portion that calculates differential limiting torque upper-limit guard values based on a preset deflection permit yaw rate and a real yaw rate of the vehicle; and (iii) upper limit guard value processing portion that limits the differential limiting torques calculated by the differential limiting torque calculating portion, using the differential limiting torque upper-limit guard values calculated by the differential limiting torque upper-limit guard value calculating portion, for obtaining differential limiting torques to be applied to the left and right drive wheels, wherein the deflection permit yaw rate is a preset maximum yaw rate at a degree not to cause a vehicle occupant to feel a deflection of the vehicle.

Accordingly, the most suitable differential limiting torque upper-limit guard values can be obtained depending on the differential state. This allows the application of differential limiting torques to the left and right drive wheels depending on a road surface condition, favorably suppressing deflection of the vehicle.

According to the second aspect of the present invention, the differential limiting torque upper-limit guard value calculating portion calculates the differential limiting torque upper-limit guard values so as to decrease a difference between the real yaw rate of the vehicle and the deflection permit yaw rate. Thus, the optimum differential limiting torque upper-limit guard values can be calculated at necessarily and adequately appropriate values so as to suppress deflection of the vehicle and to obtain the drive force.

According to the third aspect of the present invention, the differential limiting torque upper-limit guard value calculating portion increases the differential limiting torque upper-limit guard values when the real yaw rate of the vehicle is lower than the deflection permit yaw rate. Thus, the limitations on the differential limiting torques applied to the left and right drive wheels is alleviated to cause the actual yaw rate of the vehicle to be close to the deflection permit yaw rate. Consequently, the vehicle can run without causing deflection thereof regardless of the road surface condition.

According to the fourth aspect of the present invention, the differential limiting torque upper-limit guard value calculating portion decreases the differential limiting torque upper-limit guard values when the real yaw rate of the vehicle is higher than the deflection permit yaw rate. Thus, intensified limitations on the differential limiting torques applied to the left and right drive wheels prevents the actual yaw rate of the vehicle from exceeding the deflection permit yaw rate. Consequently, the vehicle can run without causing deflection regardless of the road surface condition.

According to the fifth aspect of the present invention, the differential limiting torque upper-limit guard value calculating portion alters the deflection permit yaw rate depending on a steering angle of the vehicle. Thus, the deflection permit yaw rate can be set to a required and adequately appropriate value depending on the steering angle, i.e., the degree of turning motion of the vehicle such that a vehicle occupant does not feel deflection of the vehicle, in comparison to a case where they are set to fixed values.

According to the sixth aspect of the present invention, (i) the differential limiting torque upper-limit guard value calculating portion calculates a momentum required for realizing the deflection permit yaw rate as the calculated yaw rate, using an inverted model obtained by an observer upon applying an estimated value of the state quantity based on a deviation between the real yaw rate and a calculated yaw rate, for a mathematical model obtained by solving an equation of a kinetic motion of the vehicle in terms of inputs including an input momentum applied to the vehicle and the steering angle of the vehicle and an output including the calculated yaw rate, and (ii) the differential limiting torque upper-limit guard value calculating portion calculates a torque difference between the left and right drive wheels required for generating the required momentum based on the required momentum as the differential limiting torque upper-limit guard values.

Thus, the inverted model is corrected in terms of the state quantity based on the deviation between the actual yaw rate and the calculated yaw rate. The most suitable limited-torque upper-limit guard values depending on the vehicle running condition in accordance with states of road surfaces is obtained, thereby achieving a compromise between traction of the vehicle during, for instance, the startup and running thereof and the deflection prevention thereof.

According to the seventh aspect of the present invention, the control device for the vehicular differential limiting apparatus further comprises (i) slip-tendency determining portion that determines whether the left and right drive wheels are brought into slip tendencies upon application of the differential limiting torques to the left and right drive wheels; and (ii) slip suppressing portion operative to set the differential limiting torques applied to the left and right drive wheels in preset minimal differential limiting torques for suppressing the slip-tendencies, when the slip-tendencies of the drive wheels caused by application of the differential limiting torques is determined by the slip-tendency determining portion. When an adverse affect arises due to the occurrence of the slip-tendencies upon receipt of differential limiting torques, the differential limiting torques are set to the preset minimal differential limiting torques, thereby minimizing the slip-tendencies.

EXPLANATION OF REFERENCES

Figure 1:
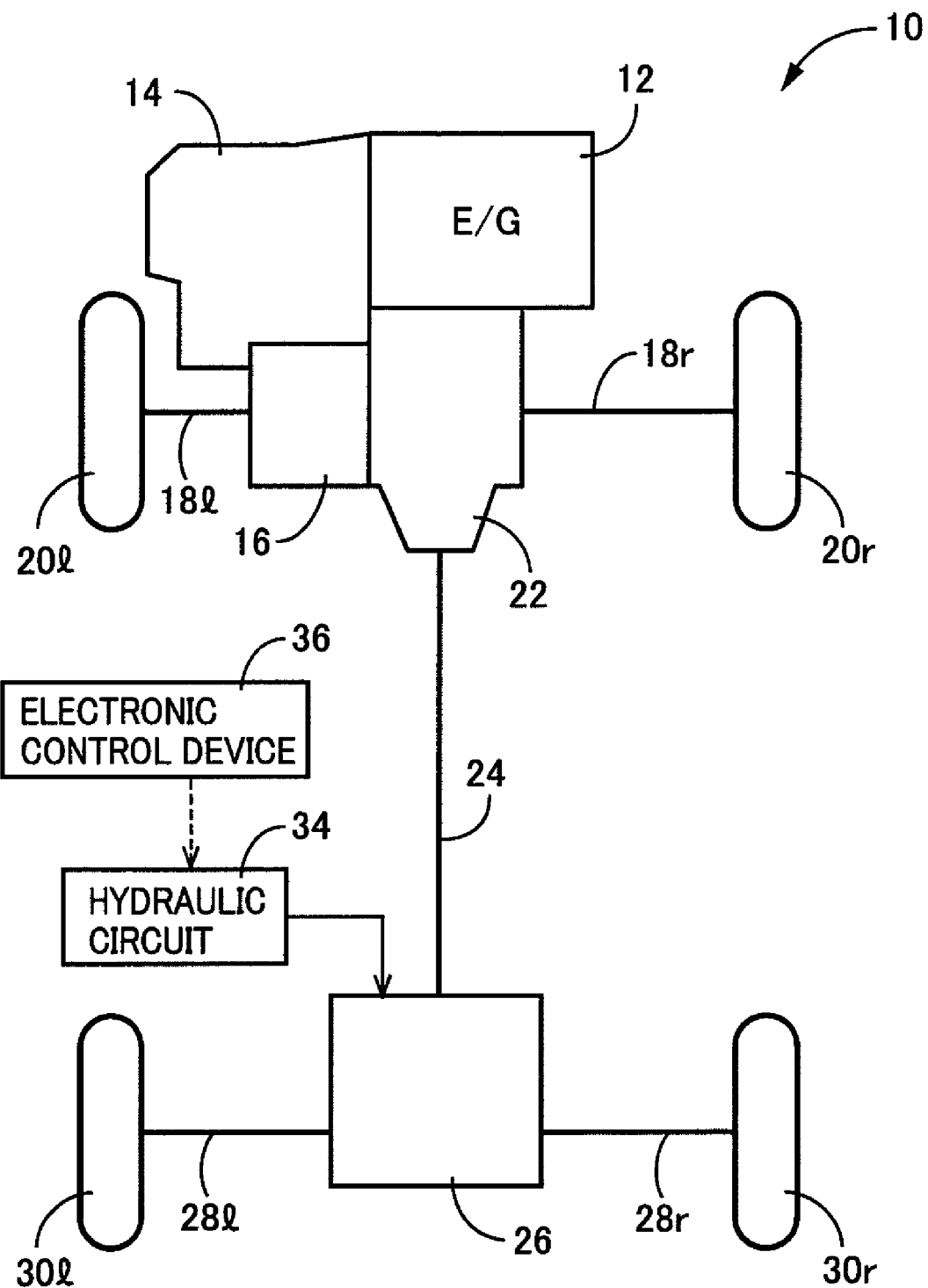
FIG. 1 is a view illustrating a structure of a drive-force transfer device of a vehicle to which a control device for a differential limiting apparatus according to the present invention is applied.

26: rear-wheel differential gear device (differential gear device)
30*l*, 30*r*: rear wheels (drive wheels)
36: electronic control device (control device)
60: differential limiting torque calculating means
62: differential limiting torque upper-limit guard value calculating means
64: vehicle momentum calculating mans
66: upper-limit guard value calculating means
72: upper-limit guard value processing means
76: slip-tendency determining means
78: slip suppressing means
C1: first clutch (differential limiting apparatus)
C2: second clutch (differential limiting apparatus)

BEST MODE FOR CARRYING OUT THE INVENTION

Now, one embodiment of the present invention will be described below in detail.
[Embodiment]

FIG. 1 is a skeleton view illustrating a structure of a fore-and-aft wheel drive vehicle having a drive-force transfer device 10 to which the present invention is preferably applied. In FIG. 1, a drive force (drive torque) generated by an engine 12 serving as a drive-force source, is transferred through an automatic transmission 14, a front-wheel differential gear device 16 and a pair of left front-wheel axis and right front-wheel axis 18*l* and 18*r* to a pair of left front wheel and right front wheel 20*l* and 20*r*. Meanwhile, the drive force is also transferred through a central differential gear device (center differential) 22, a propeller shaft 24 acting as a drive-force transfer shaft, a rear-wheel differential gear device 26 and a pair of left rear-wheel axle and right rear-wheel axle 28*l* and 28*r* to a pair of left rear wheel and right rear wheel 30*l* and 30*r*. With the drive-force transfer device 10, as shown in FIG. 1, the rear wheels 30 acting as drive wheels to which the drive force is distributed via the rear-wheel differential gear device 26, have rotational axes placed orthogonal to a rotational axis of the propeller shaft 24.

The drive-force transfer device 10 includes a hydraulic circuit 34 for controlling a hydraulic pressure or the like to be supplied to the rear-wheel differential gear device 26 for control thereof, and an electronic control device 36 for controlling the hydraulic pressure or the like to be supplied from the hydraulic control circuit 34 to the rear-wheel differential gear device 26 via electromagnetic control valves (not shown) incorporated in the hydraulic control circuit 34.

The engine 12 is an internal combustion engine such as a gasoline engine or a diesel engine or the like having, for instance, an air intake pipe or a cylinder to which fuel is supplied or injected for combustion to produce a drive force. Further, the automatic transmission 14 is an automatic transmission of step-variable gear positions that increases or decreases a speed of an input rotation delivered from the engine 12 at a predetermined speed ratios γ. The automatic transmission 14 is arranged to selectively establish one of forward-drive gear positions, a rearward-drive gear position and a neutral position with speed conversion being accomplished depending on the respective speed ratios γ. In addition, the automatic transmission 14 has an input shaft connected to an output shaft of the engine 12 via a torque converter (not shown) or the like.

The electronic control device 36 includes a so-called microcomputer having CPU, ROM, RAM and input and output interfaces or the like, in which signal processing is executed in accordance with programs preliminarily stored in ROM while utilizing a temporary storage function of RAM. The electronic control device 36 operates controlling command values of electric currents supplied to the electromagnetic valves incorporated in the hydraulic circuit 34, which controls the hydraulic pressure applied to clutches C1 and C2 (described below) incorporated in the rear-wheel differential gear device 26. Thus, left-and-right wheel torque differential controls and differential-action limiting controls, etc. are executed, which will be described below.

Further, the drive-force transfer device 10 includes a wheel-speed sensor for detecting actual rotation speeds of the rear wheels 30 corresponding to a vehicle speed; a shifted gear-position sensor for detecting a selected gear position of the automatic transmission 14; an accelerator-sensor for detecting an accelerator-opening $\theta_{ACC}$ representing a depressed stroke of an accelerator pedal; a throttle sensor for detecting an actual opening degree of a throttle valve (not shown) mounted in an air intake manifold of the engine 12; an engine rotation speed sensor for detecting an actual rotation speed of the engine 12; wheel rotation speed sensors for detecting actual rotation speeds of the left and right rear wheels 30*l* and 30*r*, respectively; a steering angle sensor for detecting a steering angle $\theta_{SW}$ of a steering wheel, and a fore-and-aft G sensor for detecting a fore-and-aft G, etc. These sensors supplies the electronic control device 36 with various signals including: a signal representing a vehicle speed; a signal representing a shifted gear position; a signal representing the throttle opening; a signal representing the engine rotation speed; signals representing rotation speeds of the drive wheels; a signal representing the steering angle $\theta_{SW}$ of the steering wheel; and a signal representing the fore-and-aft acceleration.

Figure 2:
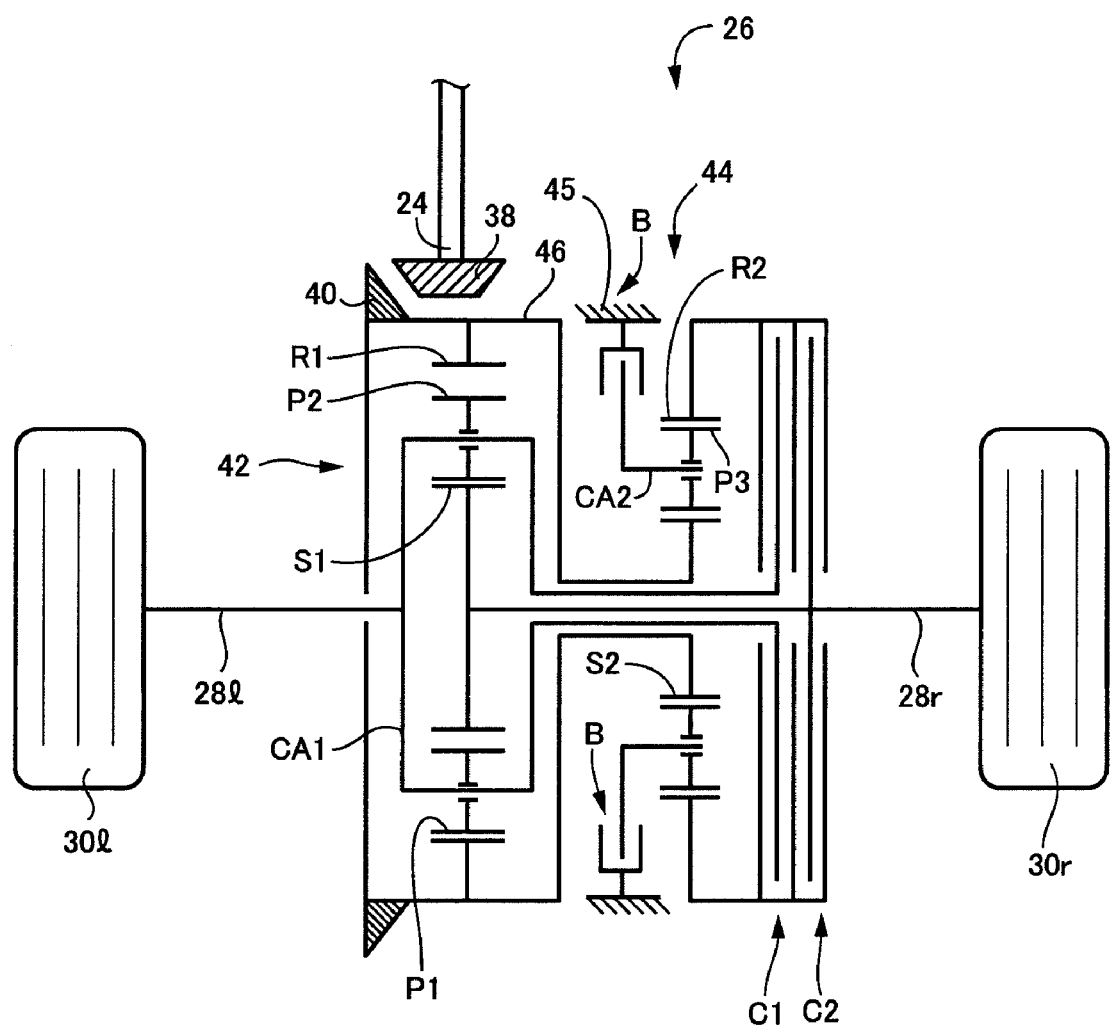
FIG. 2 is a skeleton view illustrating a structure of a rear-wheel differential gear device including the differential limiting apparatus.

FIG. 2 is a skeleton view illustrating a structure of the rear-wheel differential gear device 26. As shown in FIG. 2, the drive force is input to the rear-wheel differential gear device 26, via a bevel gear 38 connected to an end of the propeller shaft 24 rotatably driven by the engine 12 via the central differential gear device 22, and a bevel gear 40 held in meshing engagement with the bevel gear 38. The rear-wheel differential gear device 26 functions as a drive-force distributing device for distributing the input drive force to the left and right rear wheels 30l and 30r. The rear-wheel differential gear device 26 includes a differential device main body 42 for distributing the drive force to the left rear wheel 30l and the right rear wheel 30r; a speed change device 44 of a planetary gear type disposed in close proximity to the differential device main body 42 to be coaxial with the rear-wheel axles 28l and 28r; a switching brake B operative to selectively establish a power transfer path through the speed change device 44; and a first clutch C1 and a second clutch C2 operative to selectively transfer an output of the speed change device 44 to the pair of rear-wheel axles 28l and 28r.

The differential device main body 42 is a planetary gear unit of a double-pinion type including a ring gear R1, plural pairs of pinion gears P1 and P2 held in meshing engagement with the ring gear R1, a carrier CA1 supporting the pinion gears P1 and P2 to be rotatable on their axes and rotatable in orbital motion, and a sun gear S1 held in meshing engagement with the ring gear R1 via the plural pairs of pinion gears P1 and P2. This planetary gear unit has a gear ratio ρ (=the number of gear teeth of sun gear S1/the number of gear teeth of ring gear R1) determined to have a value of approximately, for instance, "0.5". The rotation of the propeller shaft 24 is transferred to the ring gear R1 internally mounted on a case 46 of the differential device 42 to be unitarily formed with the case 46, at a reduced speed caused by the bevel gears 38 and 40. The carrier CA1 is connected to the left rear wheel 30l via the left rear wheel axle 28l. The sun gear S1 is connected to the right rear wheel 30r via the right rear wheel axle 28r.

The speed change device 44 is constituted of a planetary gear unit of a single-pinion type including a sun gear S2, pinion gears P3, a carrier CA2 rotatably supporting the pinion gears P3 to be rotatable about their axes and rotatable in an orbital motion, and a ring gear R2 held in meshing engagement with the sun gear S2 via the pinion gears P3. The sun gear S2 is integrally connected to the case 46 to function as an input member of the speed change device 44. The carrier CA2 is selectively coupled to a non-rotary member 45 via the switching brake B. The ring gear R2 functioning as an output member of the speed change device 44, is selectively slippingly engaged with the carrier CA1 of the differential device main body 42 and the left rear wheel axle 28l via the first clutch C1, and selectively slippingly engaged with the sun gear S1 of the differential device main body 42 and the right rear wheel axle 28r via the second clutch C2. Further, the switching brake B1 and the first and second clutches C1 and C2 are multi-disc type friction engaging devices operative to be slippingly engaged. Control valves of the hydraulic control circuit 34 is switched by the electronic control device 36 to engage or disengage B1, C1 and C2 and to control transfer torque capacities during slipping engagements thereof depending on needs.

In the rear-wheel differential gear device 26 of such a structure set forth above, the speed change device 44 falls in a freewheeling state during a non-control state under which all of the switching brake B1 and the first and second clutches C1 and C2 remain disengaged. In this moment, only the differential device main body 42 performs a function, which permits the left and right rear wheels 30l and 30r to operate in a differential action with equally distributing the drive force thereto. Thus, during straight-ahead running of a vehicle, the differential device main body 42 unitarily rotates for causing the left and right rear wheels 30l and 30r to rotate at nearly equaled revolutions. In this moment, no torque transfer and limited differential action occur so that the rear-wheel differential gear device 26 acts as a usual open differential.

As the switching brake B is caused to disengage during startup and running of the vehicle, disengagement of the carrier CA2 of the speed change device 44 causes a power transfer between the sun gear S2 and the ring gear R2 to be interrupted. Under such a states, if the first and second clutches C1 and C2 are caused to completely engage, the rear-wheel differential gear device 26 acts as a non-slip differential so that the left and right rear wheels 30l and 30r have the same revolutions and the same drive forces. If the first and second clutches C1 and C2 are caused to partially engage, a differential rotation between the right rear wheel axle 28r and the right rear wheel 30r, and the left rear wheel axle 28l and the left rear wheel 30l is restricted. Thus, differential limiting torques ΔT is applied to the left and right rear wheels 30l and 30r at rates in line with engaging capacities of the first and second clutches C1 and C2 to perform that differential limiting controls thereof.

During such differential limiting controls, the first and second clutches C1 and C2 act as differential limiting clutches or differential limiting apparatuses. Further, as described below, the differential limiting controls are also used for preventing deflection of the vehicle during startup and running of the vehicle with the left and right rear wheels 30l and 30r held in contact with ground having different road surface frictional coefficients such as different μ-roads or straddling roads.

Furthermore, during turning and running of the vehicle, with engagement of the switching brake B, the carrier CA2 of the speed change device 44 is locked. Thus, the ring gear R2 is rotated at a reduced speed in a direction opposite to that of an input rotation (rotation of the sun gear S2) to be output. Under such a state, if the first clutch C1 is slippingly engaged, an output of the ring gear R2 is transferred to the carrier CA1, the left rear wheel axle 28l and the left rear wheel 30l. The drive force of the left rear wheel 30l is decreased such that the right rear wheel 30r has a relatively increased drive force. At the same time, since the left rear wheel 30l has revolutions at a reduced speed due to the occurrence of slipping engagement, the differential device main body 42 increases a speed of the right rear wheel 30r. Such drive force controls are executed when for instance attempting to suppress an under steer states during rightward turning operation of the like, or for instance when attempting to suppress over-steer during leftward turning of the vehicle.

On the contrary, if the second clutch C2 is brought into slipping engagement, an output of the ring gear R2 is transferred to the right rear wheel axle 28r and the right rear wheel 30r. Thus, the drive force of the right rear wheel 30r is decreased, and the left rear wheel 30l has a relatively increased drive force. At the same time, since the right rear wheel 30r has revolutions at a reduced speed due to the occurrence of the slipping engagement, the differential device main body 42 increases the speed of the left rear wheel 30l. Such controls are executed when suppressing the under-steer during the rightward turning of the vehicle or when suppressing the over-steer during the leftward turning of the vehicle.

Figure 3:
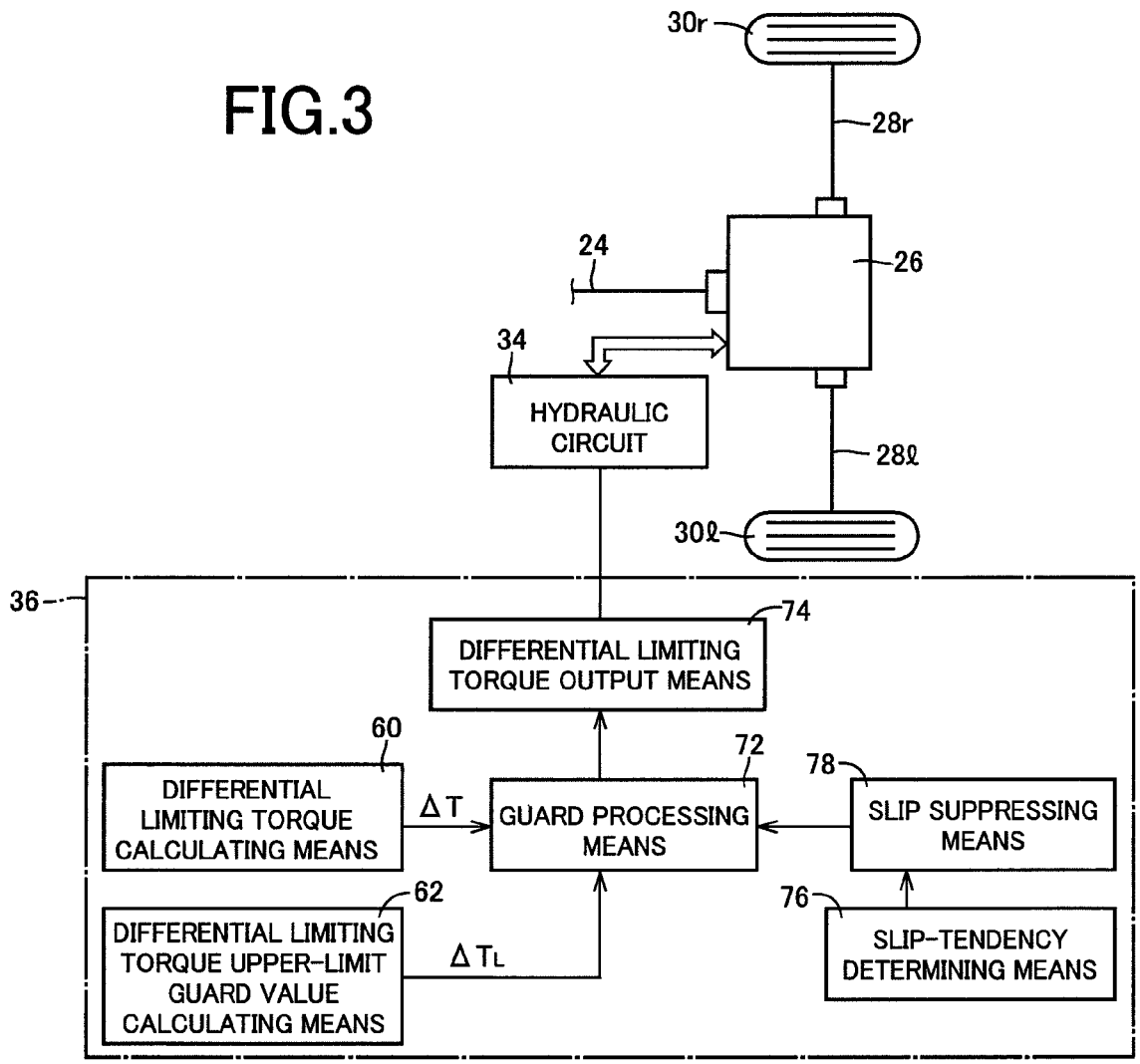
FIG. 3 is a functional block diagram illustrating a major part of a control function to be executed with an electronic control device shown in FIG. 1.

FIG. 3 is a functional block diagram illustrating a major part of a control function executed by the electronic control device 36. In FIG. 3, differential limiting torque calculating means 60 i.e., differential limiting torque calculating portion 60 calculates the differential limiting torque ΔT based on a state quantity of the vehicle such as a rotational speed difference (wheel speed difference) $\Delta V_{RD}$ between the left rear wheel 30l and the right rear wheel 30r and an accelerator-opening $\theta_{ACC}$, etc., by referring to a preset relationship. For instance, the differential limiting torque calculating means 60 calculates differential limiting torque $\Delta T_V$ derived from rotational-speed-difference based on an actual rotational speed difference $\Delta V_{RW}$ by referring to, for instance, a preliminarily stored relationship ($\Delta T_V = C \times \Delta V_{RD}$). In addition, the differential limiting torque calculating means 60 calculates differential limiting torque $\Delta T_A$ derived from accelerator-opening based on the actual rotational speed difference $\Delta V_{RW}$ by referring to a preliminarily stored relationship ($\Delta T_A = K \times \theta_{ACC} \cdot \Delta V_{RD}$). The constant C may have a fixed value but may have a function of the vehicle speed V that decreases in value with an increase in the vehicle speed.

Further, the constant K may be a fixed value but may be a function of a transverse G that increases in value with an increase in the transverse G (transverse acceleration). In addition, the differential limiting torque calculating means 60 determines differential limiting torque $\Delta T_A$ derived from accelerator-opening as the differential limiting torque $\Delta T$ when the vehicle speed is higher than a predetermined value. If the vehicle speed is lower than the given value and $\Delta T_A > \Delta T_V$, then, it is estimated that no straddling roads are present and the differential limiting torque calculating means 60 determines the differential limiting torque $\Delta T_A$ as the differential limiting torque $\Delta T$. In contrast, if $\Delta T_V > \Delta T_A$, it is estimated that the different μ-roads or the straddling roads are present and the differential limiting torque calculating means 60 determines differential limiting torque $\Delta T_V$ as the differential limiting torque $\Delta T$.

Differential limiting torque upper-limit calculating means 62 i.e., differential limiting torque upper-limit calculating portion 62 calculates a differential limiting torque upper-limit guard value $\Delta T_L$ based on a real yaw rate YR of the vehicle, a preset deflection permit yaw rate $YR_A$ and a steering angle $\theta_{SW}$ of a steering wheel by referring to a preliminarily stored relationship. That is, the differential limiting torque upper-limit guard value calculating means 62 compares the real yaw rate YR of the vehicle with the deflection permit yaw rate $YR_A$ to calculate the differential limiting torque upper-limit guard value $\Delta T_L$ so as to minimize a difference therebetween for outputting the differential limiting torque upper-limit guard value $\Delta T_L$ optimum for the vehicle condition (road surface states).

The differential limiting torque upper-limit guard value calculating means 62 increases the differential limiting torque upper-limit guard value $\Delta T_L$ when an actual vehicle yaw rate YR is lower than the preset deflection permit yaw rate $YR_A$, and decreases the differential limiting torque upper-limit guard value $\Delta T_L$ when the actual vehicle yaw rate YR is higher than the preset deflection permit yaw rate $YR_A$. The preliminarily stored relationship is determined in such a way described above. The vehicle yaw rate YR represents a varying speed of a rotational angle (yaw angle) about a vertical line PL passing across a center of gravity of the vehicle. Further, the deflection permit yaw rate $YR_A$ is a maximum yaw rate YR obtained on experimental tests at a degree not to cause a vehicle occupant to feel deflection of the vehicle, which may be a fixed value but may be a function of the steering angle $\theta_{SW}$ that varies (decreases) with an increase in the steering angle $\theta_{SW}$.

Figure 4:
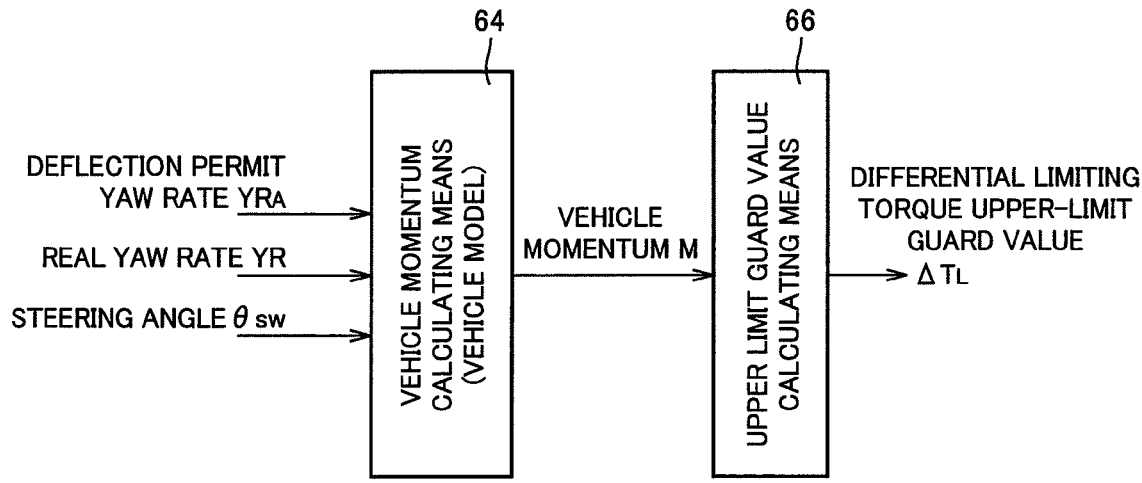
FIG. 4 is a view illustrating a exemplary structure of differential limiting torque upper-limit calculating means shown in FIG. 3.

As shown in FIG. 4, the differential limiting torque upper-limit guard value calculating means 62 includes vehicle momentum calculating means 64 i.e., vehicle momentum calculating portion 64 for calculating a vehicle momentum M about the vertical line PL passing across the center of gravity of the vehicle, based on the actual vehicle yaw rate YR, the deflection permit yaw rate $YR_A$ and the steering angle $\theta_{SW}$ of the steering wheel by referring to the preset relationship, i.e., a vehicle model (differential equation) and upper limit guard value calculating means 66 i.e., upper limit guard value calculating portion 66 for calculating the upper limit guard value $\Delta T_L$ based on the vehicle momentum M.

Figure 5:
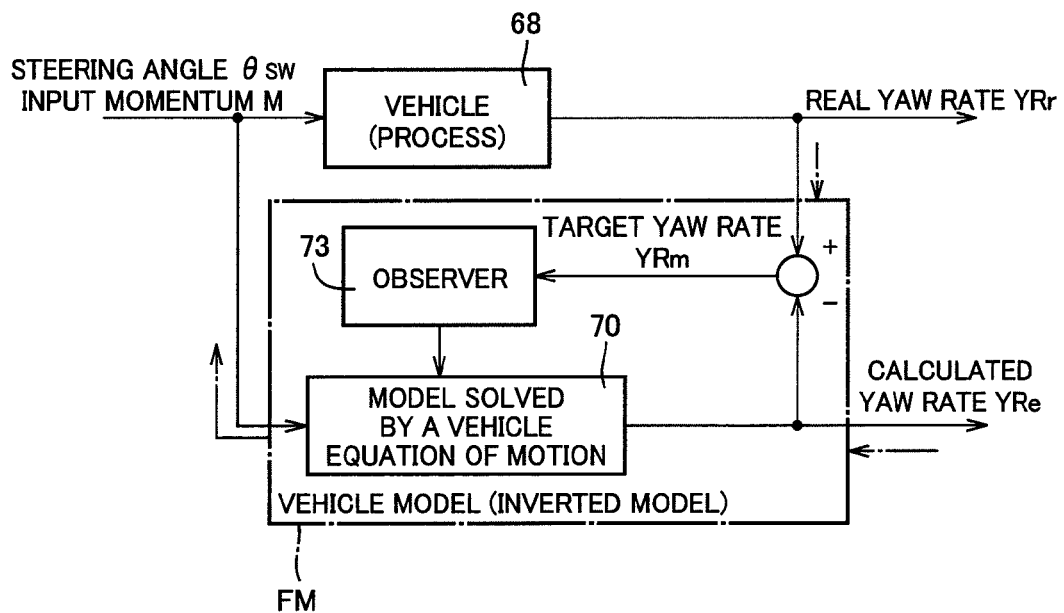
FIG. 5 is a view illustrating a vehicle model forming vehicle-momentum calculating means shown in FIG. 3.

FIG. 5 is a view illustrating the vehicle model FM for use in the vehicle momentum calculating means 64, to a system shown in FIG. 5, which the steering angle $\theta_{SW}$ and the vehicle momentum M are input to an actual vehicle 68 to generate a real yaw rate YR. A calculated yaw rate YRe is calculated based on the steering angle $\theta_{SW}$ and a real momentum M of the vehicle using a mathematical model (differential equation) 70 solved by a vehicle equations of motion. In this moment, based on a target yaw rate YRm (=YR−YRe) defined as a deviation (YR−YRe) between the real yaw rate YR and the calculated yaw rate YRe an observer 73 supplies the model 70 with a value obtained by multiplying the target yaw rate YRm by a predetermined gain G, as an estimated value of the state quantity.

The model 70 executes sequential update with correcting to a coefficient or the like so as to decrease the target yaw rate YRm based on the estimated value of the state quantity. Using an inverted model of the model 70 and the observer 73 plotted by single dot lines in FIG. 5 as the vehicle model FM, and substituting the calculated yaw rate YRe by the deflection permit yaw rate YRA result in a calculation of the vehicle momentum M required for realizing the deflection permit yaw rate YRA.

Turning back to FIG. 4, the upper limit guard value calculating means 66 calculates a torque difference between the left and right rear wheels 30*l* and 30*r*, i.e., differential limiting torques, based on the vehicle momentum M required for realizing the deflection permit yaw rate $YR_A$ calculated in such a manner mentioned above. Thus, differential limiting torques are calculated as the differential limiting torque upper-limit guard value $\Delta T_L$.

Turning back to FIG. 3, upper limit guard processing means 72 i.e., upper limit guard processing portion 72 limits the differential limiting torques $\Delta T$ calculated by the differential limiting torque calculating means 60, using the differential limiting torque upper-limit guard value $\Delta T_L$ calculated by the differential limiting torque upper-limit guard value calculating means 62, for obtaining the differential limiting torques $\Delta T$ to be applied to the left and right rear wheels 30*l* and 30*r*. That is, when the differential limiting torques $\Delta T$ do not exceed the differential limiting torque upper-limit guard value $\Delta T_L$ it is not limited, but when the differential limiting torques $\Delta T$ exceed the differential limiting torque upper-limit guard value $\Delta T_L$ the differential limiting torque upper-limit guard value $\Delta T_L$ is set as the differential limiting torques $\Delta T$. Differential limiting torque output means 74 i.e., differential limiting torque output portion 74 outputs differential limiting torques $\Delta T$ supplied via the guard processing means 72 to a hydraulic circuit 34.

Further, slip-tendency determining means 76 i.e., slip-tendency determining portion 76 determines as described below as to whether the left and right rear wheels 30*l* and 30*r* fall in slipping states if the differential limiting torques $\Delta T$ are applied to the left and right rear wheels 30*l* and 30*r* from the differential limiting torque output means 74. This determination is executed depending on a fact that a wheel rotational speed of one of the left and right rear wheels 30*l* and 30*r* remained inside during a turning travel is higher than that of the other of the left and right rear wheels 30*l* and 30*r* remained outside. In an alternative, such a determination is executed based on whether differential limiting torques $\Delta T$ and the differential limiting torque upper-limit guard values $\Delta T_L$ have the same signs. If differential limiting torques ΔT are applied when the wheel rotational speed of one of the left and right rear wheels 30*l* and 30*r* remained inside during the turning travel becomes higher than that of the other of the left and right rear wheels 30*l* and 30*r* remained outside, torque transfer occurs from an inside drive wheel rotating at a high speed, to an outside drive wheel rotating at a lower speed than that of the inside drive wheel, resulting in promoted slip tendencies.

If the slip-tendency determining means 76 determines that the left and right rear wheels 30*l* and 30*r* encounter the slip tendencies upon receipt of differential limiting torques ΔT, then slip suppressing means 78 i.e., slip suppressing portion 78 sets minimal differential limiting torques ΔT1 as the differential limiting torque upper-limit guard value $\Delta T_L$ for use in the differential limiting torque output means 74. Thus, the differential limiting torques ΔT applied to the left and right rear wheels 30*l* and 30*r* from the differential limiting torque output means 74, is deceased as small as possible, to suppress the slip tendencies of the left and right rear wheels 30*l* and 30*r*. The minimal differential limiting torques ΔT1 are set to be zeroed or take a nearly zeroed value.

Figure 6:
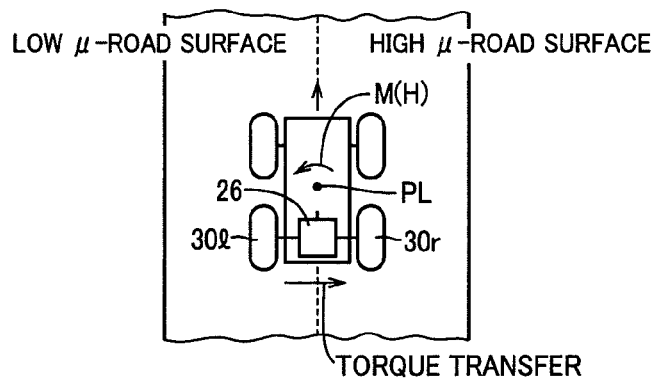
FIG. 6 is a view illustrating a momentum occurring on the vehicle when differential limiting torques are applied to left and right rear drive wheels during startup and running of the vehicle, under a situation with the left drive wheel held in contact with a low μ-road surface and the right drive wheel held in contact with a high μ-road surface.
Figure 7:
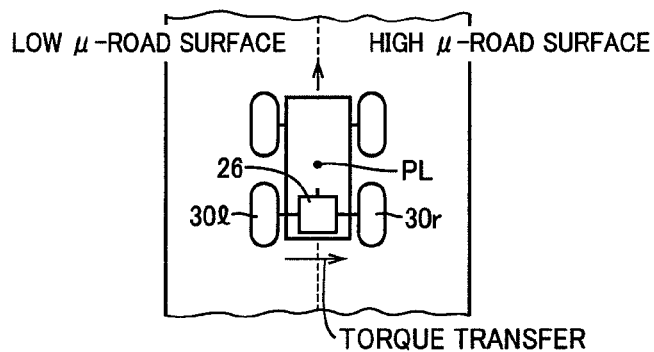
FIG. 7 is a view illustrating a situation where an actual yaw rate is less than a permit deflection yaw rate, when differential limiting torques are applied to the left and right rear drive wheels during startup and running of the vehicle, with the left drive wheel held in contact with the low μ-road surface and the right drive wheel held in contact with the high μ-road surface.
Figure 8:
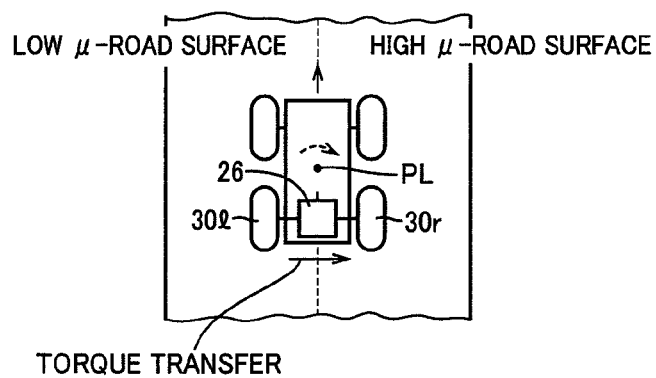
FIG. 8 is a view illustrating another situation where the actual yaw rate is greater than the permit deflection yaw rate, when differential limiting torques are applied to the left and right rear drive wheels during startup and running of the vehicle, with the left drive wheel held in contact with the low μ-road surface and the right drive wheel held in contact with the high μ-road surface.

FIGS. 6 to 8 are views illustrating the relationships between the differential limiting torque controls and behaviors of the vehicle during startup or running of the vehicle under acceleration thereof on different μ-roads, when the vehicle starts up or runs with the left and right rear wheels 30*l* and 30*r* held in contact with ground on a low μ-road surface and a high μ-road surface. FIG. 6 represents a deflection direction H caused by the vehicle momentum M occurring about the vertical line PL passing across the center of gravity of the vehicle when the left rear wheel 30*l* has a rotation speed $V_{RL}$ higher than a rotation speed $V_{RR}$ of the right rear wheel 30*r* (as expressed as $V_{RL} > V_{RR}$).

In this moment, as shown in FIG. 7, if the deflection permit yaw rate $YR_A$ exceeds the real yaw rate YR ($YR_A > YR$), it is a states in which a vehicle occupant does not feel the deflection of the vehicle yet. Consequently, the differential limiting torque upper-limit guard value $\Delta T_L$ calculated by the differential limiting torque upper-limit guard value calculating means 62, is higher than differential limiting torques ΔT calculated by the differential limiting torque calculating means 60 (as expressed as $\Delta T_L > \Delta T$). Thus, differential limiting torques ΔT are applied to the left and right rear wheels 30*l* and 30*r* with no limitations conducted by the guard processing means 72. As a result, a torque transfer occurs from the left rear wheel 30*l* rotating at a relatively high speed, to the right rear wheel 30*r* rotating at a relatively low speed to restrict the rotation of the left rear wheel 30*l*, thereby ensuring the vehicle to have the drive force and startup and acceleration performance. The vehicle momentum occurred in this case is not shown in FIG. 7, since the vehicle occupant does not feel the deflection of the vehicle.

As shown in FIG. 8, however, if the deflection permit yaw rate $YR_A$ becomes less than the real yaw rate YR (as expressed as $YR_A \leq YR$), the vehicle occupant feels the deflection of the vehicle. Consequently, the differential limiting torque upper-limit guard value $\Delta T_L$ calculated by the differential limiting torque upper-limit guard value calculating means 62, falls below the differential limiting torques ΔT calculated by the differential limiting torque calculating means 60 (as expressed as $\Delta T_L \leq \Delta T$). Thus, the differential limiting torques ΔT, after being limited by the guard processing means 72, is subsequently applied to the left and right rear wheels 30*l* and 30*r*. Consequently, the torque transfer from the left rear wheel 30*l* rotating at the relatively high speed, to the right rear wheel 30*r* rotating at the relatively low speed is limited, thereby ensuring the vehicle drive force within a range not to cause the vehicle occupant to feel the deflection of the vehicle.

Further, during leftward turning and running of the vehicle, when the rear wheel 30*l* acts as a turning inside wheel having a high rotation speed with the rear wheel 30*r* acting as a turning outside wheel having a low rotation speed, the differential limiting torques ΔT calculated by the differential limiting torque calculating means 60 are applied to the left and right rear wheels 30*l* and 30*r*, as shown in FIGS. 7 or 8. This results in the torque transfer from the left rear wheel 30*l* to the right rear wheel 30*r*, further facilitating the slip tendencies. In such a case, the slip suppressing means 78 operates to allow differential limiting torques ΔT1 applied to the left and right rear wheels 30*l* and 30*r*, to be set to a zeroed or nearly zeroed value so as to avoid progresses of the slip tendencies.

Figure 9:
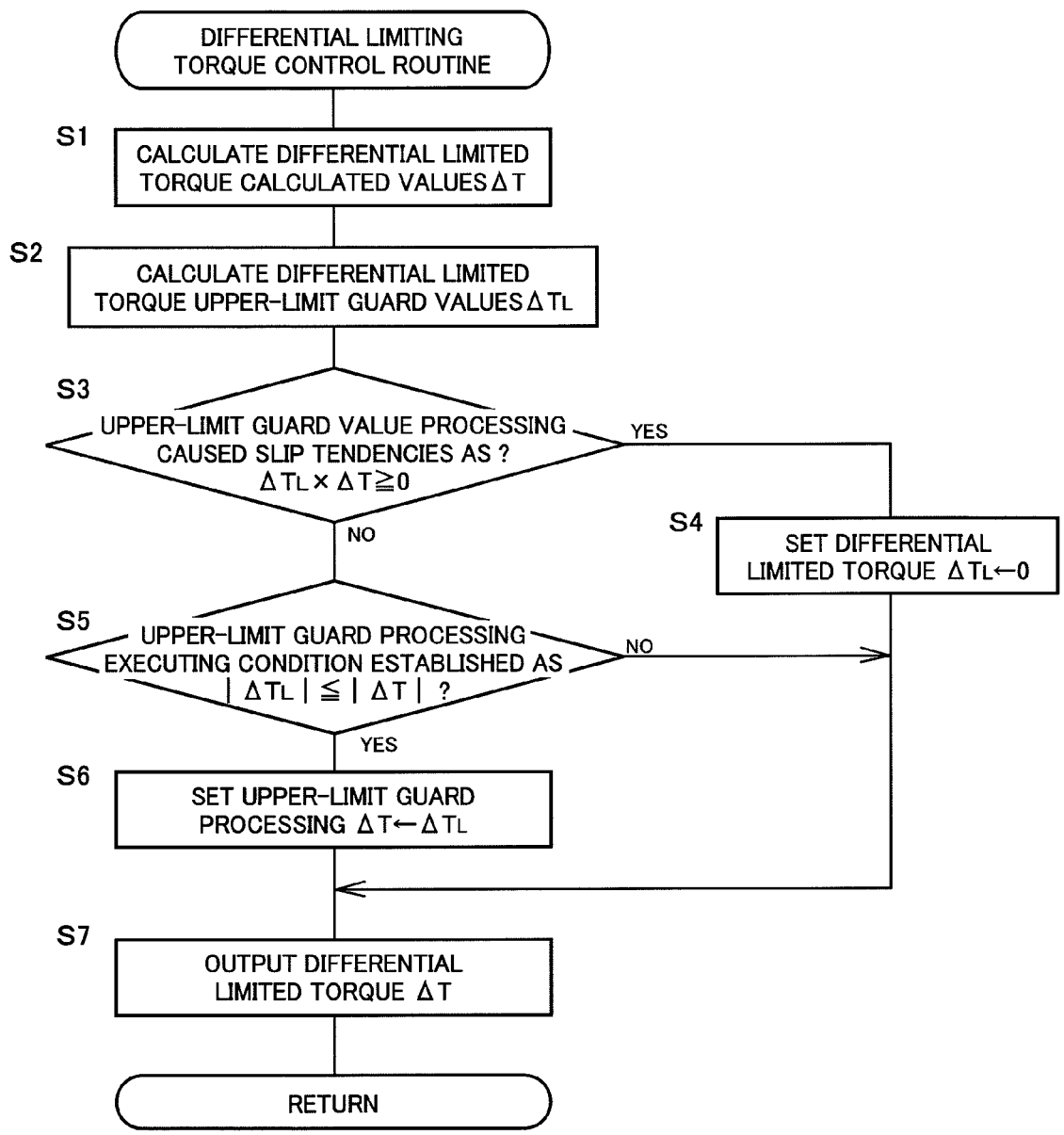
FIG. 9 is a flow chart illustrating a major part of control operations to be executed with the electronic control device shown in FIG. 1.

FIG. 9 is a flow chart illustrating a major part of control operations to be executed by the electronic control device 36. In FIG. 9, at step S1 (hereinafter the term "step" will be merely referred to as "S") corresponding to the differential limiting torque calculating means 60, differential limiting torques $\Delta T_V$ derived from rotational-speed-difference and differential limiting torques $\Delta T_A$ derived from accelerator-opening are calculated. This calculation is executed based on the state quantity of the vehicle such as the rotational speed difference (wheel speed difference) $\Delta V_{RD}$ between the left rear wheel 30*l* and the right rear wheel 30*r* and the accelerator-opening $\theta_{ACC}$, etc., by referring to the preliminarily stored relationship ($\Delta T_V = C \times \Delta V_{RD}$ and $\Delta T_A = K \times \theta_{ACC} \cdot \Delta V_{RD}$). Subsequently, at S2 corresponding to the differential limiting torque upper-limit guard value calculating means 62, the deflection permit yaw rate $YR_A$, representing the maximum yaw rate YR obtained on experimental tests, and available to take a fixed value, with causing the vehicle occupant not to feel the deflection of the vehicle, is determined based on the actual steering angle $\theta_{SW}$. This determination is executed by referring to a preliminarily stored relationship with the deflection permit yaw rate $YR_A$ varying (increasing) depending on the steering angle $\theta_{SW}$.

At S2, if the actual vehicle yaw rate YR is less than the preset deflection permit yaw rate $YR_A$, then, the operation is executed to increase the differential limiting torque upper-limit guard value $\Delta T_L$. If the actual vehicle yaw rate YR becomes greater than the predetermined deflection permit yaw rate $YR_A$, then, the differential limiting torque upper-limit guard value $\Delta T_L$ is calculated by referring to the relationship preliminarily set to decrease the differential limiting torque upper-limit guard value $\Delta T_L$. This calculation is executed based on the actual vehicle yaw rate YR, the predetermined deflection permit yaw rate $YR_A$ and the steering angle $\theta_{SW}$ effectuated by the steering wheel.

At succeeding S3 corresponding to the slip-tendency determining means 76 whether the application of differential limiting torques ΔT results in a state to facilitate the slip tendencies is determined. This determination is executed depending on whether differential limiting torques ΔT and the differential limiting torque upper-limit guard values $\Delta T_L$ have the same signs, i.e., whether or not a multiplication value between differential limiting torques ΔT and the differential limiting torque upper-limit guard values $\Delta T_L$ have a positive value ($\Delta T \times \Delta T_L > 0$). If the determination of i.e., answer to S3 is yes, at S4 corresponding to the slip suppressing means 78, the differential limiting torque upper-limit guard values $\Delta T_L$ are set in minimal differential limiting torques ΔT1 so as to minimize differential limiting torques ΔT applied to the left and right rear wheels 30*l* and 30*r*, to be as small as possible. Thus, the slip tendencies between the left and right rear wheels is suppressed.

If the determination to S3 is no, then at S5, whether an absolute value $|\Delta T_L|$ of the differential limiting torque upper-limit guard values is less than an absolute value $|\Delta T|$ of differential limiting torques is determined. If the determination of S5 is no, then, no need arises to execute upper limit processing and the execution of S6 is avoided. If the determination of S5 is yes, then, at S6 corresponding to the guard processing means 72, differential limiting torques $\Delta T$ are set in the differential limiting torque upper-limit guard values $\Delta T_L$ such that differential limiting torques $\Delta T$ do not exceed the differential limiting torque upper-limit guard values $\Delta T_L$. Then, at S7 corresponding to the differential limiting torque output means 74, differential limiting torques $\Delta T$, subjected to the upper limit guard processing at S6, is output.

As mentioned above, the control device for the vehicular differential limiting apparatus includes differential limiting torque calculating means 60 that calculates the differential limiting torques $\Delta T$ based on the state quantity of the vehicle; differential limiting torque upper-limit guard value calculating means 62 that calculates differential limiting torque upper-limit guard values $\Delta T_L$ based on the preset deflection permit yaw rate and the real yaw rate of the vehicle; and upper limit guard value processing means 72 that limits the differential limiting torques $\Delta T$ calculated by the differential limiting torque calculating means 60, using the differential limiting torque upper-limit guard values $\Delta T_L$ calculated by the differential limiting torque upper-limit guard value calculating means 62, for obtaining differential limiting torques to be applied to the left and right drive wheels. Accordingly, an optimum differential limiting torque upper-limit guard value $\Delta T_L$ can be obtained depending on the differential state. Thus, the differential limiting torques $\Delta T$ depending on the road surface states can be applied to the left and right drive wheels, thereby favorably suppressing the deflection of the vehicle.

Also, in the control device for a vehicular differential limiting apparatus of this embodiment, the differential limiting torque upper-limit guard value calculating means 62 calculates the differential limiting torque upper-limit guard values $\Delta T_L$ so as to decrease a difference between the real yaw rate YR of the vehicle and the preset deflection permit yaw rate $YR_A$. Accordingly, the differential limiting torque upper-limit guard value $\Delta T_L$ can be calculated in an appropriate value so as to suppress the deflection of the vehicle and to obtain the drive force.

Also, in the control device for a vehicular differential limiting apparatus of this embodiment, the differential limiting torque upper-limit guard value calculating means 62 increases the differential limiting torque upper-limit guard values $\Delta T_L$ when the real yaw rate YR of the vehicle is lower than the preset deflection permit yaw rate $YR_A$. Accordingly, since the limitation on the differential limiting torques $\Delta T$ applied to the left and right drive wheels can be alleviated, the actual yaw rate YR of the vehicle is approximated to the deflection permit yaw rate $YR_A$, so that the vehicle can run with no occurrence of deflection regardless of the road surface condition.

Also, in the control device for a vehicular differential limiting apparatus of this embodiment, the differential limiting torque upper-limit guard value calculating means 62 decreases the differential limiting torque upper-limit guard values $\Delta T_L$ when the real yaw rate YR of the vehicle is higher than the preset deflection permit yaw rate $YR_A$. Thus, since the imitation on the differential limiting torque $\Delta T$ applied to the left and right drive wheels is intensified, the actual yaw rate YR of the vehicle is prevented from exceeding the deflection permit yaw rate $YR_A$, so that the vehicle can run with no occurrence of deflection regardless of the road surface condition.

Also, in the control device for a vehicular differential limiting apparatus of this embodiment, the differential limiting torque upper-limit guard value calculating means 62 alters the deflection permit yaw rate YR depending on a steering angle of the vehicle. Accordingly, the values of the differential limiting torque upper-limit guard values $\Delta T_L$ can be set in required and adequately appropriate values depending on the steering angle $\theta_{SW}$, i.e., the turning degree of the vehicle such that the vehicle occupant feels the deflection of the vehicle at a degree less than that encountered when the differential limiting torque upper-limit guard values $\Delta T_L$ are set in the fixed values.

Also, in the control device for a vehicular differential limiting apparatus of this embodiment, the differential limiting torque upper-limit guard value calculating means 62 uses an inverted model FM obtained by an observer 73 upon applying an estimated value of the state quantity based on a deviation between the real yaw rate YR and the calculated yaw rate YRe, for a mathematical model obtained by solving an equation of a kinetic motion of the vehicle in terms of inputs including an input momentum applied to the vehicle and the steering angle of the vehicle and an output including the calculated yaw rate YRe.

Thus, the differential limiting torque upper-limit guard value calculating means 62 calculates the momentum M required for realizing the deflection permit yaw rate YRA as the calculated yaw rate for calculating a torque difference between those of the left and right drive wheels as the differential limiting torque upper-limit guard values required for causing the required momentum to be generated based on the required momentum. Consequently, the inversed model FM is sequentially corrected in terms of the state quantity depending on the deviation (YR−YRe) between the actual yaw rate YR and the calculated yaw rate YRe. Thus, the optimum differential limiting torque upper-limit guard value $\Delta TL$ can be obtained depending on the vehicle running condition relevant to the road surface states. Thus, compromise between traction and the prevention of deflection of the vehicle during, for instance, startup of the vehicle can be rendered.

Also, the control device for a vehicular differential limiting apparatus of this embodiment further includes slip-tendency determining means 76 that determines whether the left and right drive wheels are brought into slip tendencies upon application of the differential limiting torques to the left and right drive wheels; and slip suppressing means 78 operative to set the differential limiting torques applied to the left and right drive wheels in preset minimal differential limiting torques for suppressing the slip-tendencies, when the drive wheels are brought into the slip-tendencies upon application of the differential limiting torques by the slip-tendency determining means. Under a circumstance where the application of differential limiting torques $\Delta T$ results in the occurrence of slip tendencies in an adverse affect, differential limiting torques $\Delta T$ are set to predetermined minimal differential limiting torques $\Delta T1$, thereby suppressing the slip tendencies.

In the foregoing, while the present invention has been described above with reference to the illustrated embodiment, the present invention may be implemented in other modes.

For instance, the power transfer device 10 of the present embodiment has been described as the four-wheel-drive vehicle. However, the present invention may also be applied to a rear-wheel drive vehicle of a so-called FR type from which the front-wheel differential gear device 16 and the central differential gear device 22 are omitted since the left and right rear wheels 30l and 30r are mainly driven via the rear-wheel differential gear device 26. In another alternative, the present invention may be applied to a front-wheel drive vehicle of a so-called FF type from which the central differential gear device 22 and the rear-wheel differential gear device 26 are omitted, to allow the left and right rear wheels 30l and 30r to be driven mainly via the front-wheel differential gear device 16 formed in the same structure as that of the rear-wheel differential gear device 26 or may be applied to a rear-wheel drive vehicle of a so-called RR type. In brief, it may suffice for the present invention to be applied to a vehicle having left and right drive wheels arranged to be driven with the engine 12 via the differential gear device having the same structure as that of the rear-wheel differential gear device 26.

In the present embodiment, the drive-force source includes the internal combustion engine such as the gasoline engine or the diesel engine or the like. However, the present invention is construed not to be limited to such engines and the drive-force source may include another drive-force source such as an electric motor or the like.

In the present embodiment set forth above, the present invention is construed not to limited to the left-to-right relationships among the left rear wheel axle 28l and the right rear wheel axle 28r of the rear wheel 30, and the left rear wheel 30l and the right rear wheel 30r of the rear wheel 30. Thus, the present invention may be implemented with the left-to-right relationship placed in an inverted state.

In the present embodiment, further, although the first and second clutches C1 and C2 and the torque transfer brake B are driven with the hydraulic pressures, these engaging devices may be implemented using clutch devices and brake devices of other types such as electromagnetic clutches or the like.

In the present embodiment, furthermore, although the rear-wheel differential gear device 26 is formed of the single planetary gear unit, the rear-wheel differential gear device 26 may be comprised of various devices of other types such as planetary gear units of two or more. In an alternative, the planetary gear unit may include the sun gear, the carrier and the ring gear arranged to have connecting relationships that can be freely altered within a compatible range. The switching brake may be placed in freely altered position within a compatible range. Also, the switching brake may be omitted. Moreover, while the first and second clutches are used as the differential limiting apparatus, the differential limiting apparatus may include one clutch or an installed position of the differential limiting apparatus may be altered.

While the differential limiting torque calculating means 60 is of the type that calculates differential limiting torques $\Delta T$ based on the rotational speed difference (wheel speed difference) $\Delta V_{RD}$ between the left rear wheel 30l and the right rear wheel 30r and the accelerator-opening $\theta_{ACC}$, the differential limiting torque calculating means 60 may be of the type that calculates differential limiting torques $\Delta T$ based on a quantity of another state of the vehicle.

While the present embodiment has been described with reference to the differential limiting torque upper-limit guard value calculating means 62 employing the vehicle model including the observer 73, the differential limiting torque upper-limit guard value calculating means 62 has no need to necessarily have the observer 73.

Moreover, it is intended that the present invention described be considered only as illustrative of one embodiment and that the present invention may be implemented in various modifications and improvement apparent to those skilled in the art.

The invention claimed is:

1. A control device for a vehicular differential limiting apparatus for applying differential limiting torques to a left drive wheel and a right drive wheel to limit a differential action, permitted by a differential gear device of a vehicle, between the left and right drive wheels, the control device for the vehicular differential limiting apparatus comprising:

differential limiting torque calculating portion that calculates the differential limiting torques based on a state quantity of the vehicle;

differential limiting torque upper-limit guard value calculating portion that calculates differential limiting torque upper-limit guard values based on a preset deflection permit yaw rate and a real yaw rate of the vehicle; and upper limit guard value processing portion that limits the differential limiting torques calculated by the differential limiting torque calculating portion, using the differential limiting torque upper-limit guard values calculated by the differential limiting torque upper-limit guard value calculating portion, for obtaining differential limiting torques to be applied to the left and right drive wheels, wherein the deflection permit yaw rate is a preset maximum yaw rate at a degree not to cause a vehicle occupant to feel a deflection of the vehicle; and slip-tendency determining portion that determines whether the left and right drive wheels are brought into slip tendencies upon application of the differential limiting torques to the left and right drive wheels; and slip suppressing portion that is operative to set the differential limiting torques applied to the left and right drive wheels in preset minimal differential limiting torques for suppressing the slip-tendencies, when the slip-tendencies of the drive wheels caused by application of the differential limiting torques is determined by the slip-tendency determining portion.

2. The control device for the vehicular differential limiting apparatus according to claim 1, wherein the differential limiting torque upper-limit guard value calculating portion calculates the differential limiting torque upper-limit guard values so as to decrease a difference between the real yaw rate of the vehicle and the deflection permit yaw rate.

3. The control device for the vehicular differential limiting apparatus according to claim 2, wherein the differential limiting' torque upper-limit guard value calculating portion increases the differential limiting torque upper-limit guard values when the real yaw rate of the vehicle is lower than the deflection permit yaw rate.

4. The control device for the vehicular differential limiting apparatus according to claim 2, wherein the differential limiting torque upper-limit guard value calculating portion decreases the differential limiting torque upper-limit guard values when the real yaw rate of the vehicle is higher than the deflection permit yaw rate.

5. The control device for the vehicular differential limiting apparatus according to claim 2, wherein the differential limiting torque upper-limit guard value calculating portion alters the deflection permit yaw rate depending on a steering angle of the vehicle.

6. The control device for the vehicular differential limiting apparatus according to claim 2, wherein (i) the differential limiting torque upper-limit guard value calculating portion calculates a momentum required for realizing the deflection permit yaw rate as a calculated yaw rate, using an inverted model obtained by an observer upon applying an estimated value of the state quantity based on a deviation between the real yaw rate and the calculated yaw rate, for a mathematical model obtained by solving an equation of a kinetic motion of the vehicle in terms of inputs including an input momentum applied to the vehicle and the steering angle of the vehicle and an output including the calculated yaw rate, and (ii) the differential limiting torque upper-limit guard value calculating portion calculates a torque difference between the left and right drive wheels required for generating the required momentum based on the required momentum as the differential limiting torque upper-limit guard values.

7. A control device for a vehicular differential limiting apparatus for applying differential limiting torques to a left drive wheel and a right drive wheel to limit a differential action, permitted by a differential gear device of a vehicle, between the left and right drive wheels, the control device for the vehicular differential limiting apparatus comprising:

differential limiting torque calculating portion that calculates the differential limiting torques based on a state quantity of the vehicle;

differential limiting torque upper-limit guard value calculating portion that calculates differential limiting torque upper-limit guard values based on a preset deflection permit yaw rate and a real yaw rate of the vehicle; and upper limit guard value processing portion that limits the differential limiting torques calculated by the differential limiting torque calculating portion, using the differential limiting torque upper-limit guard values calculated by the differential limiting torque upper-limit guard value calculating portion, for obtaining differential limiting torques to be applied to the left and right drive wheels, wherein the deflection permit yaw rate is a preset maximum yaw rate at a degree not to cause a vehicle occupant to feel a deflection of the vehicle;

wherein the upper limit guard value processing portion uses the differential limiting torques calculated by the differential limiting torque calculating portion if the differential limiting torque upper-limit guard values calculated by the differential limiting torque upper-limit guard value calculating portion do not exceed the differential limiting torques calculated by the differential limiting torque calculating portion.

8. The control device for the vehicular differential limiting apparatus according to claim 7, wherein the differential limiting torque upper-limit guard value calculating portion calculates the differential limiting torque upper-limit guard values so as to decrease a difference between the real yaw rate of the vehicle and the deflection permit yaw rate.

* * * * *